US012328460B2

(12) United States Patent
Dietrich, Jr. et al.

(10) Patent No.: US 12,328,460 B2
(45) Date of Patent: Jun. 10, 2025

(54) SELECTIVE MULTIPLE-INSTANCE ENCODING OF VIDEO FRAMES TO PROVIDE TARGET FRAME RATE DURING NETWORK TRANSMISSION

(71) Applicant: GOOGLE LLC, Mountain View, CA (US)

(72) Inventors: Douglas Sim Dietrich, Jr., Los Gatos, CA (US); Robert McCool, Menlo Park, CA (US); Jean-François Roy, San Francisco, CA (US); Michael S. Green, Santa Clara, CA (US); Gurudas Somadder, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 471 days.

(21) Appl. No.: 17/767,909

(22) PCT Filed: Oct. 10, 2019

(86) PCT No.: PCT/US2019/055495
§ 371 (c)(1),
(2) Date: Apr. 11, 2022

(87) PCT Pub. No.: WO2021/071486
PCT Pub. Date: Apr. 15, 2021

(65) Prior Publication Data
US 2023/0140250 A1    May 4, 2023

(51) Int. Cl.
*H04N 21/2343* (2011.01)
*H04N 21/234* (2011.01)
*H04N 21/81* (2011.01)

(52) U.S. Cl.
CPC ......... *H04N 21/234381* (2013.01); *H04N 21/23406* (2013.01); *H04N 21/8173* (2013.01)

(58) Field of Classification Search
None
See application file for complete search history.

(56) References Cited

U.S. PATENT DOCUMENTS

| 8,817,889 B2 | 8/2014 | Bouton et al. |
| 9,374,604 B2 | 5/2016 | Nemiroff et al. |

(Continued)

FOREIGN PATENT DOCUMENTS

| EP | 3503570 A1 | 6/2019 |
| JP | H05216800 A | 8/1993 |

(Continued)

OTHER PUBLICATIONS

Translation of Korean Office Action issued Oct. 26, 2023 for KR Application No. 1020227013904, 2 pages.

(Continued)

*Primary Examiner* — Junior O Mendoza

(57) ABSTRACT

A system includes a video source device connected to a video destination device via a network. The video source device includes a network interface and an encoder coupled to the network interface. The encoder is configured to encode a first stream of rendered video frames having a first frame rate to generate a second stream of encoded video frames for transmission over the network via the network interface, wherein the second stream has a second frame rate greater than the first frame rate. As part of this encoding process, the encoder is configured to selectively encode multiple instances of at least one video frame of the first stream for inclusion in the second stream to compensate for the difference between the first frame rate and the second frame rate.

27 Claims, 3 Drawing Sheets

(56) References Cited

U.S. PATENT DOCUMENTS

| | | | |
|---|---|---|---|
| 2005/0104873 A1 | 5/2005 | Hatti et al. | |
| 2006/0230428 A1 | 10/2006 | Craig et al. | |
| 2014/0189091 A1* | 7/2014 | Tamasi | H04L 65/80 709/224 |
| 2015/0348509 A1* | 12/2015 | Verbeure | H04N 9/3188 345/82 |
| 2016/0008716 A1 | 1/2016 | Perlman et al. | |
| 2016/0255131 A1* | 9/2016 | Bulava | H04L 65/75 709/219 |
| 2017/0109122 A1 | 4/2017 | Schmidt et al. | |
| 2019/0104311 A1 | 4/2019 | Amer et al. | |
| 2019/0208234 A1* | 7/2019 | Van Brandenburg | H04N 21/8455 |

FOREIGN PATENT DOCUMENTS

| | | |
|---|---|---|
| JP | H11252566 A | 9/1999 |
| JP | 2014086770 A | 5/2014 |
| WO | 2009073799 A1 | 6/2009 |

OTHER PUBLICATIONS

International Search Report and Written Opinion mailed Mar. 27, 2020 for corresponding International Application No. PCT/US2019/055495, 11 pages.

Chen et al., "A complexity-scalable software-based MPEG-2 video encoder,"Journal of Zhejiang University—Science A 5, No. 5; May 2004; ISSN 1009-3095; 7 pages.

"Qualcomm Adreno Vulkan Developer Guide", Qualcomm Technologies, Inc., Aug. 8, 2017, 74 pages.

Translation of Japanese Office Action mailed Aug. 16, 2023 for JP Application No. JP2022-521503, 12 pages.

Translation of Japanese Office Action mailed May 7, 2024 for JP Application No. 2022521503, 6 pages.

International Preliminary Report on Patentability mailed Apr. 21, 2022 for PCT/US2019/055495, 7 pages.

Translation of Korean Allowance of Patent mailed Jul. 1, 2024 for KR Application No. KR1020227013904, 5 pages.

Communication pursuant to Article 94(3) EPC mailed Jul. 31, 2024 for EP Application No. 19795395.3, 7 pages.

* cited by examiner

SELECTIVE MULTIPLE-INSTANCE ENCODING OF VIDEO FRAMES TO PROVIDE TARGET FRAME RATE DURING NETWORK TRANSMISSION

CROSS-REFERENCE TO RELATED APPLICATIONS

The present application is a U.S. National Stage under 35 U.S.C. § 371 of International Patent Application Serial No. PCT/US2019/055495, entitled "SELECTIVE MULTIPLE-INSTANCE ENCODING OF VIDEO FRAMES TO PROVIDE TARGET FRAME RATE DURING NETWORK TRANSMISSION" and filed on 10 Oct. 2019, the entirety of which is incorporated by reference herein.

BACKGROUND

Video source devices typically render video frames (also known as "pictures") of a video stream at a nominal frame rate. This nominal frame rate may be fixed with little or no variation in frame rate, or there may be some variation in effective frame rate due to, for example, the workload or effort required to render any given video frame in the video stream. Transmission networks utilized to transmit such video streams in real time typically operate more effectively when the transmission workload is consistent and at or above a threshold level. Video streams rendered at a variable or different frame rate than the nominal frame rate can lead to frames arriving faster or slower than the nominal frame rate and thus cause relatively small or large idle time spans between video frames in the stream. These idle time spans can subject such video streams to network transmission issues. Such issues can include deprioritization of the channel established for transmitting the video stream or delayed recognition of problems in the network. Thus, video streams that present inconsistent transmission workloads can negatively impact a viewer's experience in the video stream playback of the video stream at the destination device receiving the video stream via the network.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
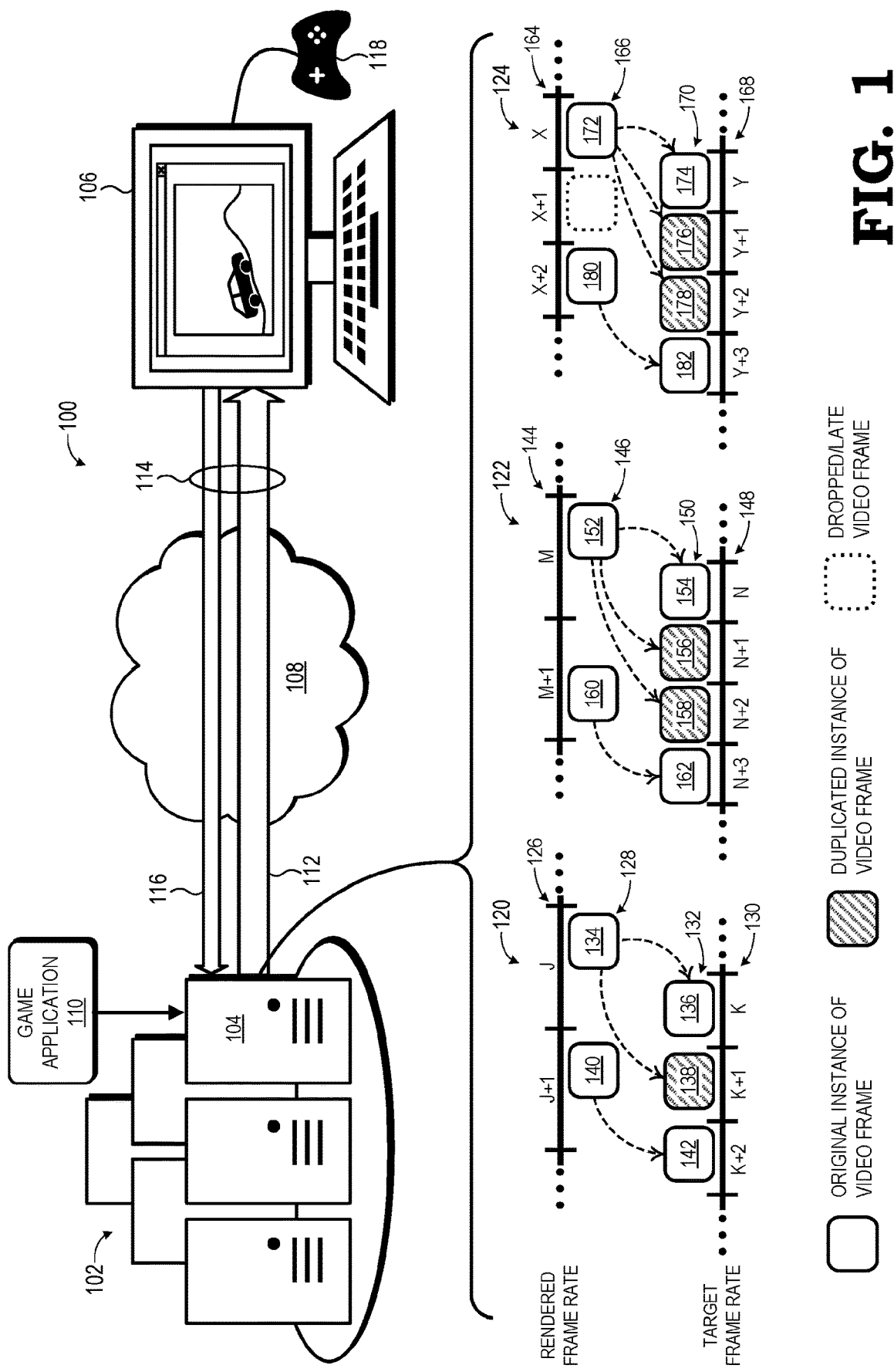
FIG. 1 is a block diagram illustrating an electronic system employing selective video frame instance duplication to maintain a constant network transmission workload for transmitting an encoded video stream in accordance with some embodiments.

Ensuring a video stream presents a relatively constant workload to the network transmitting the video stream typically results in a more reliable or otherwise effective transmission of the data representing the video stream. One conventional approach for providing a network with a constant transmission workload is to buffer the video data at the source device so as to be able to transmit the video data at a constant rate. However, such an approach incurs latency in the delivery of the video content, which often is impracticable for remotely-served video gaming and other real-time video streaming applications. For such real-time video streaming applications, one approach used for attempting to provide this constant workload is to automatically duplicate every encoded frame in the video stream at the source device, thereby reducing the time periods in which the channel for transmitting the video stream is idle. For example, if a frame rate of 60 frames per second (FPS) is deemed suitable for a particular network, and the source device renders video frames at a nominal rate of 30 FPS, the source device duplicates each video frame once to create a resulting video stream at 60 FPS. However, this approach is based on both an assumption that the frame rate of the video stream is known and an assumption that the frame rate is constant. If the rendering frame rate is unknown or the rendering process results in a variable frame rate, then the automatic duplication of each and every video frame will produce an excessive number of video frames when the frame rate is, or increases to, more than 50% of the target frame rate for the network, which could overburden the network and thus negatively impact the viewing experience. Conversely, the automatic single duplication of each and every video frame will produce video frames at below the target frame rate when the frame rate is, or decreases below, less than 50% of the target frame rate, and thus potentially subjects the transmitted video stream to the same deleterious effects of an insufficient or inconstant workload for the network.

In contrast, the present application describes systems and techniques for selective duplication of instances of encoded video frames in a video stream transmitted via a network so as to provide a constant, sufficiently frequent transmission workload to the network for transmission of the video stream. In at least one embodiment, this selective duplication process selectively duplicates encoded instances of video frames based on whether the current rate of video frame rendering is meeting a target frame rate for transmission of the resulting encoded video stream. While the current rendered frame rate is at or above the target frame rate, the rendered frames are encoded and transmitted as part of the video stream without duplication. However, when the current rendered frame rate effectively falls below the target frame rate, the source device operates to insert one or more duplicate instances of one or more rendered video frames to increase the effective frame rate in the video stream up to the target frame rate.

In one embodiment, this selective duplication process is triggered by a periodic event that is synchronized or otherwise representative of the frame period of the target frame rate, such as an emulated vertical synchronization ("vsync") signal that occurs at the transition or border between one frame period and the next frame period at the target frame rate. The rendering component of the source device renders video frames for the video stream at a native frame rate, which can be fixed or variable, and may be lower than, equal to, or greater than the target frame rate. Each rendered frame is stored in a frame buffer accessible to an encoder of the source device.

In response to assertion of the periodic event or trigger, the encoder attempts to encode the next video frame for inclusion as an encoded video frame in the video stream. In the event that the next video frame is in the frame buffer and ready for encoding, the encoder proceeds with encoding the next video frame and inserting the resulting encoded video frame into the video stream for transmission to a destination device via the network. However, in the event that the next video frame is not ready for encoding (e.g., the next video frame is only partially rendered at the time that the periodic trigger is asserted), then rather than delay encoding of the next video frame once it is ready and thus potentially idling the channel in the network, the encoder instead duplicates the previous video frame by including a first duplicate encoded instance of the previous video frame, and thus ensuring that the target frame rate is maintained in the video stream being transmitted. In the event that a next video frame still is not ready for encoding by the time the periodic trigger is next asserted, the encoder again duplicates the previous video frame by including a second duplicate encoded instance of the previous video frame, and again maintaining the target frame rate in the encoded video stream. This process of including another encoded instance of the previous video frame can be repeated any number of times until the next rendered video frame is in the frame buffer and ready for encoding.

A duplicate encoded instance of the previous video frame, in one embodiment, includes a second, third, fourth, or further encoding, or re-encoding, of the previous video frame, and thus can result in a higher quality encoding of the previous video frame than the original encoding of the previous video frame. In other embodiments, each encoded video frame is temporarily buffered, and rather than re-encoding the previous video frame, the same encoded instance of the previous video frame instead is provided as a copy of the buffered and already-encoded instance of the previous video frame.

FIG. 1 illustrates an electronic system 100 employing a selective video frame duplication process for providing an encoded video stream having at least a target frame rate in accordance with at least one embodiment. The electronic system 100 includes a data center 102 having a video source device 104 connected to a video destination device 106 via a packet-switched network 108. The video source device 104 operates to execute a video source software application 110 that results in the real-time rendering of a sequence of video frames, which the video source device 104 encodes for inclusion in an encoded video stream 112 transmitted to the video destination device 106 via a channel 114 (also commonly referred to as a "pipe" or a "session"). The video destination device 106 operates to receive the encoded video stream 112, decode the encoded video frames contained therein, and display the decoded video frames in sequence so as to provide a video presentation of rendered graphical content to a user of the video destination device 106. For purposes of illustration, the electronic system 100 is described herein in the example context of a remotely-served video gaming system, and in this context the video source device 104 is a gaming server (and thus referred to herein as "gaming server 104"), the video destination device 106 is a user's gaming device (and thus referred to herein as "gaming device 106"), and the video source software application 110 is a video game application (and thus referred to herein as "video game application 110"). However, the techniques described herein are applicable to any of a variety of video system implementations in which a real-time video stream is rendered and encoded at a source device, and the resulting encoded video stream is transmitted from the source device to a destination device via a network, such as in systems for streaming live or pre-recorded television content over the Internet.

The packet-switched network 108 (hereinafter, "the network 108") includes one or more wired or wireless personal area networks (PANs), one or more wired or wireless local area networks (LANs), one or more wired or wireless wide area networks (WANs), or combinations thereof. To illustrate by way of an example, the network 108 can include a wired LAN (not shown) connecting the gaming server 104 to the Internet, which in turn is connected to the gaming device 104 via a wireless LAN (WLAN). The gaming server 104, described in greater detail below with reference to FIG. 2, includes compute and storage resources to facilitate execution of the video game application 110 so as to render the sequence of video frames in accordance with user input provided from the gaming device 106 via an upstream sub-channel 116, and to encode the resulting video frames. The gaming server 104 further includes a network interface to the network 108 to provide the data representative of the encoded video frames for transmission to the gaming device 106 via the channel 114, along with any associated metadata and audio data generated by the video game application 110.

The gaming device 106 includes a network interface (not shown) connected to the network 108 to receive the video data, metadata, and audio data transmitted from the gaming server 104 via the network 108, compute, storage, and display resources (not shown) for decoding and displaying the video frames of the transmitted video stream 112 and for outputting the corresponding audio content, as well as a game controller 118, a keyboard (not shown), or other user input/output (I/O) devices for receiving the user input during gameplay for transmission to the gaming server 104 via the upstream sub-channel 116, which in turn is provided to the executed video game application 110 and influences the graphical content included in the rendered video frames and the audio content included in the audio stream.

In at least one embodiment, execution of the video game application 110 results in the rendering of video frames at a frame rate, referred to herein as the "rendering frame rate." To illustrate, the video game application 110 could be designed or programmed to render video frames at a specified nominal frame rate, such as 30 FPS. Alternatively, the compute resources allocated by the gaming server 104 can play a role in setting the rendering frame rate. In some implementations, the rendering frame rate is fixed and constant; that is, the video frames are always rendered at the same rate. In other implementations, the rendering frame rate can vary to a degree based on different rendering loads required by each video frame or changes in compute resource allocation over time. For example, a complex scene typically requires more compute effort to render than a simpler scene, and the complexity of a given video frame could burden the gaming server 104 such that the video frame is rendered "late"; that is, is ready for encoding at a point later than the nominal "ready" point for each frame period given the nominal frame rate. Thus, in such instances, the video stream 112 can have an effective frame rate of, for example, 30 FPS over a large averaging window, but the instantaneous frame rate may vary above 30 FPS or below 30 FPS depending on rendering workload.

The network 108, in one embodiment, implements one or more policies, such as quality-of-service (QoS) policies, or operational parameters that favor a constant transmission workload for a given transmission channel, including the channel 114 established between the gaming server 104 and the gaming device 106, over a bursty workload. For example, these policies or parameters typically provide that when a channel is idle for at least a threshold duration, the packets of that channel are thereafter deprioritized (i.e., the channel is deprioritized) by the network 108, which in turn can result in a lower QoS for the packets of that channel. Further, a bursty workload may result in the transmission workload exceeding the transmission channel's capacity, which in turn causes queuing or even packet loss. Either situation may cause delays and redundant transmissions (retransmissions), which are inherently inefficient. Accordingly, in at least one embodiment, a designer, implementer, manager or other entity in control of the gaming server 104 identifies a threshold frame rate, referred to herein as a "target frame rate", for the video stream 112 which is expected or predicted to provide a sufficiently constant transmission workload for the network 108 so as to mitigate or eliminate channel deprioritization or other network degradation effects for the transmission of the video stream 112 via the network 108 that otherwise would likely occur for transmission of the video stream 112 at a lower frame rate. This target frame rate can be determined through experimentation or modeling of the network 108. For example, the gaming server 104 or other components of the data center 102 can transmit one or more test data streams with different transmission workload properties over the network 108 to one or more destination devices and measure the network statistics or otherwise observe the operation of the network 108. Alternatively, characteristics of the network 108 can be determined and an estimate of the minimum transmission workload estimated from the determined characteristics. In yet other implementations, the target frame rate is fixed based on prior experiences or other estimations.

In some instances, the rendering frame rate for the video game application 110 is sufficient to meet or exceed the target frame rate. For example, when the target frame rate for the network 108 is determined to be 30 FPS and the video game application 110 as executed by the gaming server 104 is a non-varying 60 FPS (that is, with no delayed or dropped video frames), then the constancy and frequency of the transmission workload required for the video stream 112 is sufficient to avoid the deleterious effects that a more bursty transmission would incur from the network 108. However, in instances in which the target frame rate for the network 108 exceeds the effective rendering frame rate of the video game application 110 as executed by the gaming server 104, or where dropped or delayed rendered video frames are likely to introduce relatively substantial idle transmission periods for the channel 114, the video stream 112 is potentially subject to negative transmission effects due to this bursty transmission workload. Accordingly, in at least one embodiment, the gaming server 104 employs a selective video frame duplication process that selectively incorporates multiple encoded instances of certain rendered video frames into the video stream 112 so as to compensate for the difference between a lower rendering frame rate and a higher target frame rate, including compensating for any delayed or dropped video frames in the rendering process which could result in a lower instantaneous rendering frame rate.

For this process, the gaming server 104, in one embodiment, employs a countdown timer or other mechanism to represent successive frame periods in accordance with the target frame rate. The countdown timer is set to a count equivalent to the duration of each frame period (hereinafter, "target frame period") that corresponds to the target frame rate, and the expiration of the countdown (and subsequent reset) serve as a period trigger that acts as an emulated vertical sync signal or other demarcation of the transition between one target frame period and the next target frame period. To illustrate, for a target frame rate of 60 FPS, the target frame period is 16 milliseconds (ms) and thus the countdown timer is set to expire and reset every 16 ms. When the countdown timer expires, the gaming server 104 determines whether the next rendered video frame to be encoded is in fact ready to be encoded (e.g., is fully rendered and stored in the frame buffer used as the source of video frames for the encoder). If so, the gaming server 104 encodes the next video frame and provides the resulting encoded instance of the video frame to the network interface for transmission via the network 108 as part of the video stream 112. Otherwise, if the next video frame is not ready to be encoded when the countdown timer expires (e.g., the next video frame is not fully rendered in the frame buffer), then rather than wait for the next video frame to become ready, the gaming server 104 instead provides a second, or duplicate, encoded instance of the previous video stream to the network interface for transmission via the network 108 as part of the video stream 112. That is, the gaming server 104 either copies a previously-encoded instance of the previous video frame or re-encodes the previous video frame, to generate a second encoded instance of the previous video frame for inclusion in the video stream 112. Under this approach, the gaming server 104 ensures that the video stream 112 includes encoded video frames at least at the target frame rate, even if two or more of the included encoded video frames are the same or different instances of the same rendered video frame, and thus ensuring that the video stream 112 presents a sufficiently constant transmission workload for the network 108.

Diagrams 120, 122, and 124 of FIG. 1 illustrate three examples of this selective video frame duplication process with respect to corresponding portions of rendered video streams and corresponding portions of encoded streams. In the example of diagram 120, the timeline 126 represents the rendered frame rate of the gaming server 104 when executing the video game application 110 to render a stream of rendered video frames (a portion of which is represented by render stream 128). The span between each tick mark on timeline 126 represents a corresponding frame period (numbered frame periods J and J+1 from right to left) at the rendered frame rate. Each box in the render stream 128 represents a rendered video frame for a corresponding frame period. Further, in diagram 120, the left edge of each box in render stream 128 represents the point in time at which the rendering of the corresponding video frame has completed and thus is ready for encoding. Timeline 130 represents the target frame rate for the video stream 112 to provide a sufficiently constant transmission workload for the network 108, with each tick mark on the timeline 130 representing a corresponding frame period (numbered frame period K to K+2 from right to left) at the target frame rate. Encoded stream 132 represents a portion of the video stream 112, wherein each box in encoded stream 132 represents an encoded instance of a video frame from the render stream 128 that is inserted or otherwise included in the sequence of encoded video frames transmitted via the network 108 as video stream 112. The boxes without hatch fill in render stream 128 each represents the first, or original, encoded instance of a corresponding rendered video frame from the render stream 128 and the box with hatch fill represents an additional, or duplicate, encoded instance of a rendered video frame from the render stream 128. In the example represented by diagram 120, the target frame rate is considerably higher (e.g., approximately 170%) than the render frame rate; to illustrate, the render frame rate may be, for example, 30 FPS while the target frame rate is 50 FPS.

Each tick mark on timeline 130 represents the end of one frame period and the start of the next frame period at the target frame rate, and thus also represents the expiration of the countdown timer used as the periodic trigger synchronized to the target frame rate. Thus, in response to each periodic trigger represented by a corresponding tick mark on timeline 130, the gaming server 104 determines whether a next rendered video frame is available in the render stream 128. To illustrate, at the tick mark signaling the start of the frame period K, rendered video frame 134 is ready for encoding, and thus the gaming server 104 encodes the rendered video frame 134 to generate an original encoded instance 136 of the video frame 132 for inclusion in the encoded stream 132 for frame period K. However, at the start of frame period K+1, no newly rendered video frame is available for encoding. Accordingly, in response to the trigger event represented by the start of frame period K+1, the gaming server 104 determines that the next video frame is not ready for encoding, and thus instead generates a second encoded instance 138 of the already once-encoded video frame 134 for inclusion in the encoded stream 132 for frame period K+1. At the start of the next frame period K+2, a rendered video frame 140 is ready for encoding, and thus the gaming server 104 encodes the video frame 140 to generate an original encoded instance 142 for inclusion in the encoded stream 132 for frame period K+2.

Turning to the example of diagram 122, the timeline 144 represents the rendered frame rate of the gaming server 104 when executing the video game application 110 to render a stream of rendered video frames (a portion of which is represented by render stream 146). As with the previous example, the span between each tick mark on timeline 144 represents a corresponding frame period (numbered frame periods M and M+1 from right to left) at the rendered frame rate. Each box in the render stream 146 represents a rendered video frame for a corresponding frame period, with the left edge of each box representing the point in time at which the rendering of the corresponding video frame has completed and thus is ready for encoding. Timeline 148 represents the target frame rate for the video stream 112 to provide a sufficiently constant transmission workload for the network 108, with each tick mark on the timeline 148 representing a corresponding frame period (numbered frame period N to N+3 from right to left) at the target frame rate. Encoded stream 150 represents a portion of the video stream 112, wherein each box in encoded stream 150 represents an encoded instance of a video frame from the render stream 146 that is inserted or otherwise included in the sequence of encoded video frames transmitted via the network 108 as video stream 112. In the example represented by diagram 122, the target frame rate is considerably higher (e.g., approximately 2×) than the render frame rate; to illustrate, the target frame rate may be, for example, 60 FPS while the rendered frame rate is only 30 FPS.

In response to each periodic trigger represented by a corresponding tick mark on timeline 148, the gaming server 104 determines whether a next rendered video frame is available in the render stream 146. To illustrate, at the tick mark signaling the start of the frame period N, rendered video frame 152 is ready for encoding, and thus the gaming server 104 encodes the rendered video frame 152 to generate an original encoded instance 154 of the video frame 152 for inclusion in the encoded stream 150 for frame period N. However, at the start of frame period N+1, no newly rendered video frame is available for encoding, and so in response to the trigger event represented by the start of frame period N+1, the gaming server 104 determines that the next video frame is not ready for encoding and instead generates a second encoded instance 156 of the already once-encoded video frame 152 for inclusion in the encoded stream 150 for frame period N+1. At the start of the next frame period N+2, a rendered video frame still is not yet available for encoding, and thus the gaming server 104 generates a third encoded instance 158 of the already twice-encoded video frame 152 for inclusion in the encoded stream 150 for frame period N+2. At the start of the next frame period N+3, a rendered video frame 160 is ready for encoding, and thus the gaming server 104 encodes the video frame 160 to generate an original encoded instance 162 for inclusion in the encoded stream 150 for frame period N+3.

For the example represented by diagram 124, the timeline 164 represents the rendered frame rate of the gaming server 104 when executing the video game application 110 to render a stream of rendered video frames (a portion of which is represented by render stream 166). As with the previous examples, the span between each tick mark on timeline 164 represents a corresponding frame period (numbered frame periods X to X+2 from right to left) at the rendered frame rate. Each box in the render stream 166 represents a rendered video frame for a corresponding frame period, with the left edge of each box representing the point in time at which the rendering of the corresponding video frame has completed and thus is ready for encoding. Timeline 168 represents the target frame rate for the video stream 112 to provide a sufficiently constant transmission workload for the network 108, with each tick mark on the timeline 168 representing a corresponding frame period (numbered frame period Y to Y+3 from right to left) at the target frame rate. Encoded stream 170 represents a portion of the video stream 112, wherein each box in encoded stream 170 represents an encoded instance of a video frame from the render stream 146 that is inserted or otherwise included in the sequence of encoded video frames transmitted via the network 108 as video stream 112. In the example represented by diagram 124, the target frame rate is slightly higher (e.g., approximately 33% greater) than the render frame rate; to illustrate, the rendering frame rate may be, for example, 60 FPS while the target frame rate is 80 FPS.

In response to each periodic trigger represented by a corresponding tick mark on timeline 168, the gaming server 104 determines whether a next rendered video frame is available in the render stream 166. At the start of the frame period Y, rendered video frame 172 is ready for encoding, and thus the gaming server 104 encodes the rendered video frame 172 to generate an original encoded instance 174 of the video frame 172 for inclusion in the encoded stream 170 for frame period Y. In the illustrated example, rendering of a video frame for frame period X+1 is either skipped or delayed until frame period X+2. Thus, in response to the trigger event represented by the start of frame period Y+1, the gaming server 104 generates a second encoded instance 176 of the already once-encoded video frame 172 for inclusion in the encoded stream 170 for frame period Y+1. At the start of the next frame period Y+2, a rendered video frame still is not yet available for encoding, and thus the gaming server 104 generates a third encoded instance 178 of the already twice-encoded video frame 172 for inclusion in the encoded stream 170 for frame period Y+2. At the start of the next frame period Y+3, a rendered video frame 180 is ready for encoding, and thus the gaming server 104 encodes the video frame 180 to generate an original encoded instance 182 for inclusion in the encoded stream 170 for frame period Y+3.

As diagrams 120, 122, and 124 illustrate, the selective inclusion of one or more additional encoded instances of the same video frame results in an encoded video stream 112 that has a frame rate at least equal to the target frame rate, and thus providing a transmission workload for the channel 114 carrying the video stream 112 that is expected to be sufficient to maintain effective transmission of the underlying data by the network 108. In contrast, encoding the rendered video frames at their rendered frame rate without any video frame duplication to compensate for the difference between rendered frame rate and target frame rate can lead to an inconsistent or otherwise bursty transmission workload, and thus would subject the video stream 112 to potential transmission problems. To illustrate, the idle periods between transmission of one encoded video frame and the next encoded video frame at 50 FPS or, even more likely, the relatively longer idle period resulting from the absence of transmitted data for the skipped/dropped video frame (such as during frame period X+1 in the example of diagram 124), could cause the network 108 to deprioritize the channel 114 or otherwise assign a lower QoS level to the channel 114, and thus potentially subject the encoded video data and other data transmitted over the channel 114 to additional latency and jitter, increased packet loss, and the like. The transmission of the encoded video data at the lower rendered frame rate typically leads to larger gaps between transmitted data packets compared to the transmission of the encoded video data with duplicated video frames at the higher target frame rate, with these larger gaps leading to delayed identification of problems in the network 108, such as queued packets or packet loss and the consequent duplicative retransmissions.

Moreover, by selectively duplicating encoded instances of certain video frames rather than automatically duplicating each and every video frame, an excessive transmission workload is more likely to be avoided. To illustrate, in the example described above, the effective frame rate of the video stream 112 was increased from 50 FPS rendered to 60 FPS transmitted. In contrast, the automatic every-frame single duplication approach would increase the effective frame rate of a resulting video stream from 50 FPS rendered to 100 FPS transmitted, which rather than improving the transmission quality, could instead overload the channel in the network 108 and lead to even less effective transmission of the video stream.

Figure 2:
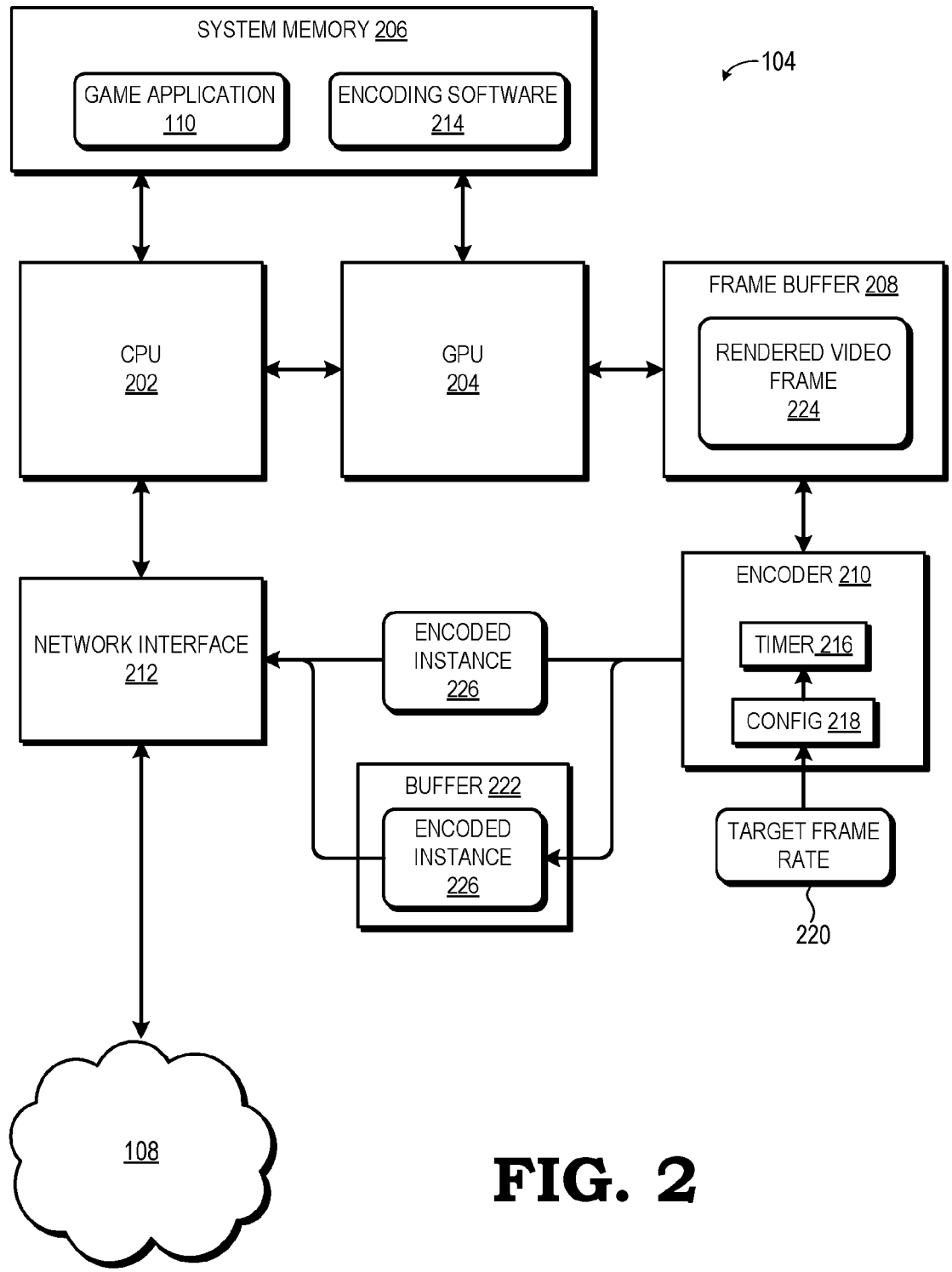
FIG. 2 is a block diagram illustrating a server of the electronic system of FIG. 1 in accordance with some embodiments.

FIG. 2 illustrates an example implementation of the gaming server 104 as a video source device employing the selective video frame duplication process described herein in accordance with some embodiments. In the depicted example, the gaming server 104 includes one or more central processing units (CPUs) 202, one or more graphics processing units (GPUs) 204, at least one system memory 206, a frame buffer 208 (which can be implemented as part of system memory 206 or a separate memory), an encoder 210, and a network interface 212 coupled or couplable to the network 108. The encoder 210 can be implemented as a hardware component separate from the CPU 202 and the GPU 204, such as an application-specific integrated circuit (ASIC) or other hardcoded logic, a field programmable gate array (FPGA) or other programmable logic, and the like, as one or both of the CPU 202 or GPU 204 executing encoding software 214 stored in, for example, the system memory 206, or a combination of hardcoded or programmable logic and processor-executed software.

In one embodiment, the encoder 210 includes or has access to a countdown timer 216 and configuration storage 218, which can include, for example, a programmable register, a one-time-programmable (OTP) memory, a set of one or more fuses or anti-fuses, a basic input/output (BIOS) setting, and the like. The configuration storage 218 operates to store a representation of a determined target frame rate 220 for the network 108. This representation can include, for example, a number of cycles of a clock (not shown) used by the countdown timer 216 that is equivalent to the duration of the target frame period for the target frame rate 220. The countdown timer 216, when reset, is configured to reset to an initial countdown value based on the representation of the target frame rate 220 stored in the configuration storage 218.

The network interface 212 includes any of a variety of network interfaces suitable for coupling to the network 108, such as a LAN network interface, a WLAN network interface, and the like. In implementations in which a video frame is included as two or more encoded instances in the video stream 112 by copying a previously-encoded instance of the video frame, the gaming server 104 further can include a buffer 222 that serves to store a copy of the encoded video frame for subsequent access. The buffer 222 can be part of the frame buffer 208 or as part of a separate memory.

Figure 3:
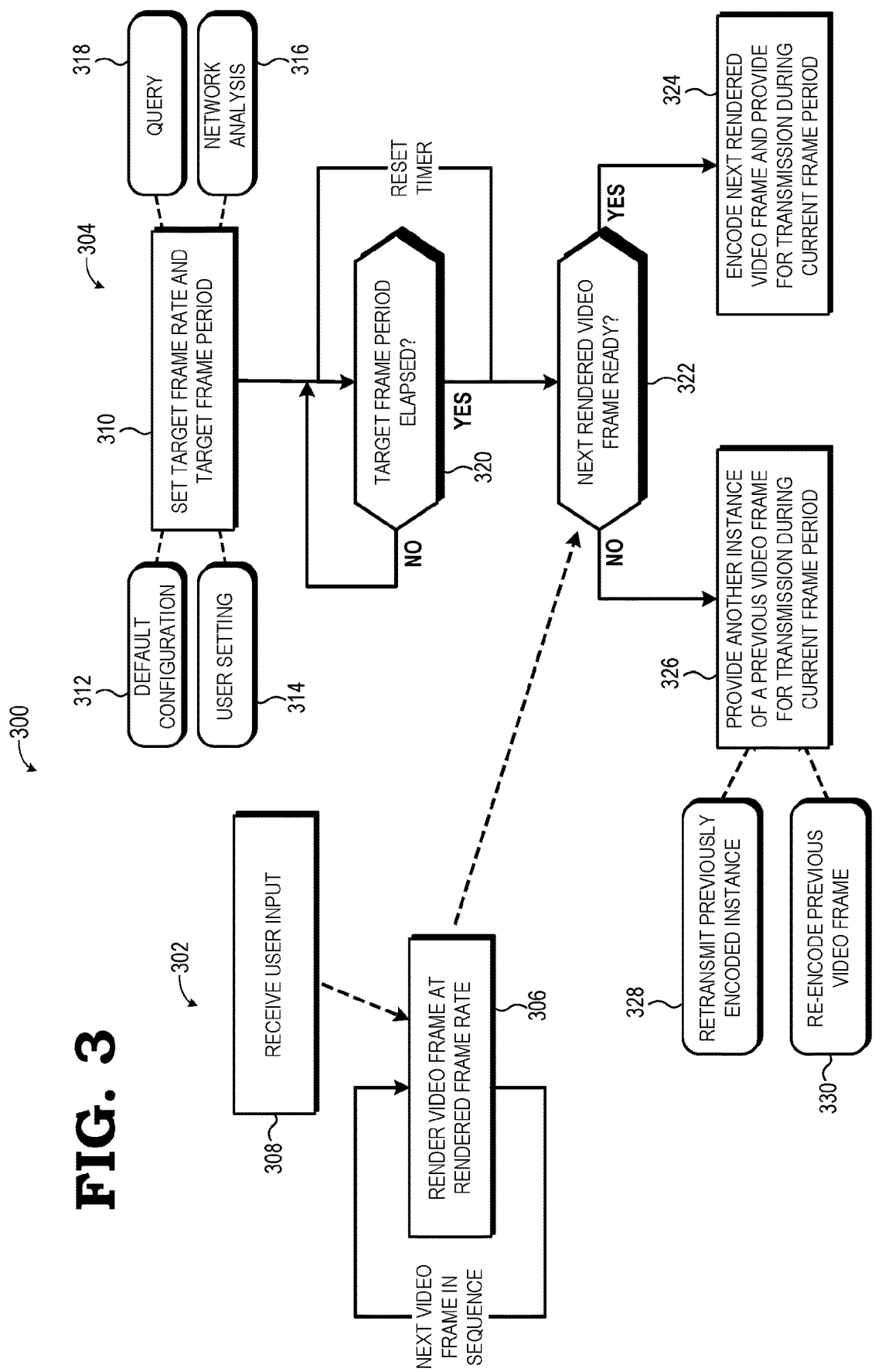
FIG. 3 is a flow diagram illustrating a method for selective video frame instance duplication for real-time transmission of an encoded video stream in accordance with some embodiments.

FIG. 3 illustrates an example method 300 for selective video frame duplication in an encoded video stream to achieve a target frame rate expected to provide a sufficiently constant transmission workload in accordance with some embodiments. The method 300 is described in the example context of the electronic system 100 of FIG. 1 and, in particular, with reference to the gaming server 104 of FIG. 2. As shown, the method 300 includes a rendering sub-process 302 and an encoding/transmission sub-process 304 that operate in parallel.

For the rendering sub-process 302, the CPU 202 executes the video game application 110 stored in system memory 206 so as to determine a game scene and to determine a sequence of views of the game scene and then directs the GPU 204 to render, at a corresponding iteration of block 306, a video frame (e.g., rendered video frame 224, FIG. 2) in the frame buffer 208 for a corresponding view of the sequence of views of the game scene. As described above, the CPU 202 and GPU 204 together control the rendering of video frames at an effective rendering frame rate that may be substantially fixed, or may vary depending on rendering complexity, current rendering resources available, and the like. Further, in the gaming system 100 of FIG. 1, the user of the gaming device 106 "plays" the game by providing user input via the game controller 118, keyboard, or other I/O device, wherein the user input indicates a desired movement of an avatar in the gaming scene, selection of a displayed option, and the like. Such input is periodically or asynchronously transmitted from the gaming device 106 via the network 108 (e.g., via the upstream sub-channel 114) and a set of user input for a given time slice is received at the gaming server 104 via the network interface 212 at an iteration of block 308 of the rendering sub-process 302. The CPU 202 receives this slice of user input, interprets the user input, and controls the rendering process for one or subsequent video frames based on the user input.

For the encoding sub-process 304, the encoder 210 is initialized prior to starting the encoding process to generate the encoded video stream 112. This initialization process includes determining the target frame rate 220 for the encoded video stream 112. As represented by block 310, the target frame rate 220 can be automatically set to a default value, as represented in the OTP memory or fuses/anti-fuses implementing the configuration storage 218. For example, as represented by block 312 a management entity responsible for the data center 102 analyzes or models a number of different network scenarios and determines a default target frame rate that is expected to be sufficient for most, or all, examined network scenarios, and configures each gaming server at the data center 102 to utilize this default target frame rate. Alternatively, as represented by block 314, the gaming server 104 can permit the user of the gaming device 106 to select or otherwise specify the target frame rate 220 via, for example, a graphical user interface (GUI) or other user input mechanism. To illustrate, based on the user's expectations or prior experience, the user can select a target frame rate 220 that is expected to provide a balance between effective network transmission and display quality that is suitable to the particular user.

As represented by block 316, the gaming server 104 can set the target frame rate 220 based on a real-time analysis of the network 108. In this implementation, the gaming server 104 can analyze current network statistics, such as whether there are any other channels competing for bandwidth with the channel 114, the current end-to-end packet latency and jitter, the current available bandwidth, a projected future bandwidth/latency/jitter, the various QoS levels currently available, and the like. From this information, the gaming server 104, or other system at the data center 102 or another remote system, determines the target frame rate 220 expected to suit current network conditions. Thereafter, the gaming server 104 can periodically perform this analysis again to determine an updated target frame rate 220; that is, the target frame rate 220 can be dynamically updated over the course of generation of the encoded video stream 112.

Still further, as illustrated by block 318 in some embodiments the game server 104 queries the gaming device 106 to determine a specified or preferred frame rate supported by the display of the gaming device 106. To illustrate, the gaming device 106 can be set to display video from the video stream 112 at a fixed display rate, and thus to reduce the processing load on the gaming device 106 the gaming server 104 can seek to provide the video frames in the encoded video stream 112 at or near the fixed display rate so that reliance on frame rate conversion processes at the gaming device 106 can be reduced or eliminated. In such instances, the gaming server 104 can apply a minimum threshold to the queried frame rate so that the resulting target frame rate is expected to provide a sufficiently constant transmission workload to the network 108. For example, if it is determined that a target frame rate below 40 FPS will present a transmission workload that is inconsistent enough to likely trigger network transmission deterioration, then the gaming server 104 sets the target frame rate 220 to the greater of the queried frame rate and 40 FPS.

With the target frame rate 220 determined and programmed into the configuration storage 218, the encoding process for generating and transmitting the encoded video stream 112 commences. As described above, in at least one embodiment, the timing of the encoding process is controlled at least in part on an emulated vsync signal provided by periodic expiration of the countdown timer 216, with each countdown duration representing the duration of a target frame period according to the target frame rate 220. Accordingly, in each vsync cycle, the countdown timer 216 is reset to the count value representing the duration of the target frame period and at block 320 of each vsync cycle the encoder 210 monitors for expiration of the countdown timer 216, and thus signaling the lapse of the previous target frame period and the start of the next target frame period.

In response to an expiration of the countdown timer 216, and thus signaling the start of a new frame period at the target frame rate 220, at block 322 the encoder 210 checks the frame buffer 208 to determine if a previously-unencoded rendered video frame (that is, "the next" video frame) is ready and available in the frame buffer 208 for encoding. In the event that a next video frame is ready for encoding (e.g., is fully rendered and all data to be utilized for encoding is present in the frame buffer 208 or otherwise available to the encoder 210 at that time), then at block 324 the encoder 210 encodes the next video frame (e.g., rendered video frame 224) to generate a corresponding encoded instance 226 of the video frame and provides the encoded instance 226 of the video frame to the network interface 212 for transmission to the gaming device 106 via the channel 114 in the network 108 as part of the encoded video stream 112. The encoder 210 employs any of a variety of standardized or proprietary video encoding techniques, such as, for example, a Motion Pictures Experts Group (MPEG) H.264-compliant or H.265-compliant encoding process, a VP8-compliant or VP9-compliant encoding process, and the like. The resulting encoded data can be incorporated into any of a variety of transmission containers, such as a Hypertext Markup Language 5 (HTML5) Video container (representing the encoded video stream 112), which is then packetized by the network interface 212 and the resulting packets transmitted over the network 108 to the gaming device 106 via the channel 114.

In implementations in which duplicate copies of previously-encoded instances of a video frame are inserted to achieve the target frame rate 220, a copy of the encoded instance 226 of the video frame also can be temporarily buffered in the buffer 222 so as to be available for use as a duplicate encoded instance if the next video frame is not ready on time, as described below.

Returning to block 322, if the next video frame is not ready to be encoded when the countdown timer 216 has expired for the current cycle, then rather than wait for the next video frame to become ready, at block 326 the encoder 210 instead provides for the insertion of a duplicate encoded instance of the most-recently-encoded video frame into the video stream 112 for transmission. If a rendered video frame was ready for encoding in the previous target frame period, then this duplicate encoded instance is the second encoded instance of that video frame. However, if a rendered video frame was not ready for encoding in the previous target frame period, then the encoder 210 relies on the rendered video frame from an even earlier target frame period as the source video frame, and thus this duplicate encoded instance is at least the third encoded instance of the same earlier rendered video frame. Thus, the process represented by blocks 322 and 326 can be repeated any number of times to maintain the target frame rate 220 until a rendered video frame comes ready for encoding.

The encoder 210 provides the duplicate encoded instance of a previously-encoded video frame in any of a variety of ways. As illustrated by block 328, and as mentioned above in one embodiment a copy of the originally encoded instance 226 of a video frame is temporarily stored in the buffer 222 and the encoder 210 provides a duplicate encoded instance of this video frame by accessing the buffer 222 and retransmitting a copy of this copy of the originally encoded instance 226 via the network interface 212 as the encoded video frame for the corresponding target frame period. Thus, in this approach, the video stream 112 can have sequences of two or more exact copies of the same encoded video frame in order to compensate for the difference between a higher target frame rate 220 and a lower effective rendered frame rate.

In other embodiments, as represented by block 330, the encoder 210 re-encodes the previously rendered video frame 224 again to generate a re-encoded instance of the rendered video frame for inclusion in the encoded video stream 112 for the current target frame period. In at least one embodiment, the encoder 210 leverages the original encoding of the video frame for this re-encoding process so as to generate a re-encoded instance of the video frame that can have a higher encoding quality than the original encoded instance of the video frame. To illustrate, by using the original encoded instance as a reference frame, the encoder 210 can utilize the bit budget allocated to the re-encoded instance to provide higher quality motion vector information and higher quality residual data (which in turn provide a higher-fidelity decoded video frame at the gaming device 106) compared to the motion vector information and residual data that can be obtained for the original encoding of the video frame for the same bit budget due to the original encoding being unable to rely on a previous encoding of the same video frame as a reference frame.

In accordance with one aspect, a method includes rendering, at a first device, a first stream of unencoded video frames at a first frame rate. The method further includes encoding, at the first device, video frames of the first stream to generate a second stream of encoded video frames, the second stream having a second frame rate greater than the first frame rate, and wherein encoding video frames of the first stream includes selectively providing multiple encoded instances of at least one video frame of the first stream for inclusion in the second stream to compensate for the difference between the first frame rate and the second frame rate, and providing the second stream for transmission to a second device via a network.

Selectively providing multiple encoded instances of at least one video frame can include encoding a first video frame of the first stream to generate a first encoded instance of the first video frame for inclusion in the second stream for a first frame period, determining whether a second video frame of the first stream is ready to be encoded for a second frame period following the first frame period, wherein the first frame period and second frame period are based on the second frame rate, responsive to determining the second video frame is ready to be encoded, encoding the second video frame to generate an encoded instance of the second video frame for inclusion in the second stream for the second frame period, and responsive to determining the second video frame is not ready to be encoded, re-encoding the first video frame or duplicating the first encoded instance of the first video frame to generate a second encoded instance of the first video frame for inclusion in the second stream for the second frame period. In some embodiments, rendering the first stream includes rendering each video frame of the first stream in a frame buffer in sequence at the first frame rate, and determining whether the second video frame of the first stream is ready to be encoded for the second frame period includes, in response to an expiration of a timer representing an end of the first period, determining whether the rendering of the second video frame in the frame buffer has completed. Selectively providing multiple encoded instances of at least one video frame further can include determining whether a third video frame of the first stream is ready to be encoded for a third frame period following the second period, responsive to determining the third video frame is ready to be encoded, encoding the third video frame to generate an encoded instance of the third video frame for inclusion in the second stream for the third frame period, and responsive to determining the third video frame is not ready to be encoded, re-encoding the first video frame or duplicating the first encoded instance of the first video frame to generate a third encoded instance of the first video frame for inclusion in the second stream for the third frame period.

In some aspects, re-encoding the first video frame to generate the second encoded instance of the first video frame includes re-encoding the first video frame based at least in part on the first encoded instance of the first video frame so as to generate the second encoded instance of the first video frame with a higher picture quality than the first encoded instance. In some embodiments, the method further includes determining the second frame rate based on a configuration of the first device, and further can include querying the second device via the network to determine the second frame rate. In some aspects, the method further includes executing a video game application at the first device, wherein rendering the first stream of unencoded video frames comprises rendering the first stream responsive to instructions executed at the video game application and further responsive to user game controller commands received via the network.

In one aspect, a method includes providing a stream of encoded video frames with a specified frame rate for transmission from a first device to a second device via a network. Providing the stream of encoded video frames includes encoding a first video frame to generate a first encoded video frame for inclusion in the stream for a first frame period corresponding to the specified frame rate, and responsive to determining that a second video frame is not ready for encoding for a second frame period following the first frame period, re-encoding the first rendered video frame to generate a second encoded video frame for inclusion in the stream for the second frame period. In some aspects, the method further includes responsive to determining that the second video frame is ready for encoding for the second frame period, encoding the second video frame to generate a third encoded video frame for inclusion in the stream for the second frame period. In some embodiments, the method further includes, responsive to determining that a third video frame is not ready for encoding for a third frame period following the second frame period, re-encoding the first video frame to generate a third encoded video frame for inclusion in the stream for the third frame period. The method also can include determining the specified frame rate based on at least one of: a default configuration of the first device; a user-specified setting; a query from the first device to the second device via the network; and an analysis of the network. Determining that the second video frame is not ready can include determining that a frame buffer of the first device does not contain a completed rendering of the second video frame at an expiration of a timer that corresponds to the start of the second frame period. The method also may include rendering, at the first device, a sequence of video frames for buffering in the frame buffer at a frame rate lower than the specified frame rate, the sequence including the first video frame and the second video frame. In some aspects, re-encoding the first video frame to generate a second encoded video frame includes re-encoding the first video frame based in part on the first encoded video frame so as to generate the second encoded video frame with a higher picture quality than the first encoded video frame.

In accordance with other aspects, a system includes a first device comprising a network interface configured to couple to a network and an encoder coupled to the network interface and configured to encode a first stream of rendered video frames having a first frame rate to generate a second stream of encoded video frames for transmission over the network via the network interface, wherein the second stream has a second frame rate greater than the first frame rate, and wherein the encoder is configured to selectively encode multiple instances of at least one video frame of the first stream for inclusion in the second stream to compensate for the difference between the first frame rate and the second frame rate. The system also can include a second device coupled to the network and configured to receive and decode the second stream of encoded video frames for playback at a display of the second device, wherein the second device can include at least one of a keyboard or a game controller to provide user input to the first device via the network and the first device includes a server configured to execute a video game application to render the first stream of rendered video frames based on the user input.

In some embodiments, the encoder is configured to selectively provide multiple encoded instances of at least one video frame by encoding a first video frame of the first stream to generate a first encoded instance of the first video frame for inclusion in the second stream for a first frame period, determining whether a second video frame of the first stream is ready to be encoded for a second frame period following the first frame period, wherein the first frame period and second frame period are based on the second frame rate, responsive to determining the second video frame is ready to be encoded, encoding the second video frame to generate an encoded instance of the second video frame for inclusion in the second stream for the second frame period, and responsive to determining the second video frame is not ready to be encoded, re-encoding the first video frame or duplicating the first encoded instance of the first video frame to generate a second encoded instance of the first video frame for inclusion in the second stream for the second frame period. The encoder can be configured to render each video frame of the first stream in a frame buffer in sequence at the first frame rate, and configured to determine whether the second video frame of the first stream is ready to be encoded for the second frame period by determining, in response to an expiration of a timer, whether the rendering of the second video frame in the frame buffer is completed.

In some aspects, the encoder is configured to selectively provide multiple encoded instances of at least one video frame by determining whether a third video frame of the first stream is ready to be encoded for a third frame period following the second frame period, responsive to determining the third video frame is ready to be encoded, encoding the third video frame to generate an encoded instance of the third video frame for inclusion in the second stream for the third frame period, and responsive to determining the third video frame is not ready to be encoded, re-encoding the first video frame to generate a third encoded instance of the first video frame for inclusion in the second stream for the third frame period. The encoder can be configured to re-encode the first video frame based at least in part on the first encoded instance of the first video frame so as to generate the second encoded instance of the first video frame with a higher picture quality than the first encoded instance of the first video frame. In some aspects, the encoder is further configured to determine the second frame rate based on at least one of: a default configuration; a user-specified setting; an analysis of the network; and a query to a second device coupled to the network and configured to receive and decode the second stream of encoded video frames for playback at a display of the second device.

In accordance with yet another aspect, a non-transitory computer-readable medium embodies a set of executable instructions. The set of executable instructions is to manipulate at least one processor to perform a method or combination of methods as described above.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

A computer-readable storage medium includes any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
rendering, at a first device, a first stream of unencoded video frames at a first frame rate;
encoding, at the first device, video frames of the first stream to generate a second stream of encoded video frames, the second stream having a second frame rate greater than the first frame rate, and wherein encoding video frames of the first stream includes selectively providing multiple encoded instances of at least one video frame of the first stream for inclusion in the second stream to compensate for a difference between the first frame rate and the second frame rate; and
providing the second stream for transmission to a second device via a network.

2. The method of claim 1, wherein selectively providing multiple encoded instances of at least one video frame comprises:
encoding a first video frame of the first stream to generate a first encoded instance of the first video frame for inclusion in the second stream for a first frame period;
determining whether a second video frame of the first stream is ready to be encoded for a second frame period following the first frame period, wherein the first frame period and second frame period are based on the second frame rate;
responsive to determining the second video frame is ready to be encoded, encoding the second video frame to generate an encoded instance of the second video frame for inclusion in the second stream for the second frame period; and
responsive to determining the second video frame is not ready to be encoded, re-encoding the first video frame or duplicating the first encoded instance of the first video frame to generate a second encoded instance of the first video frame for inclusion in the second stream for the second frame period.

3. The method of claim 2, wherein:
rendering the first stream comprises rendering each video frame of the first stream in a frame buffer in sequence at the first frame rate; and
determining whether the second video frame of the first stream is ready to be encoded for the second frame period comprises:
in response to an expiration of a timer representing an end of the first frame period, determining whether the rendering of the second video frame in the frame buffer has completed.

4. The method of claim 2, wherein selectively providing multiple encoded instances of at least one video frame further comprises:
determining whether a third video frame of the first stream is ready to be encoded for a third frame period following the second frame period;
responsive to determining the third video frame is ready to be encoded, encoding the third video frame to generate an encoded instance of the third video frame for inclusion in the second stream for the third frame period; and
responsive to determining the third video frame is not ready to be encoded, re-encoding the first video frame or duplicating the first encoded instance of the first video frame to generate a third encoded instance of the first video frame for inclusion in the second stream for the third frame period.

5. The method of claim 2, wherein re-encoding the first video frame to generate the second encoded instance of the first video frame comprises:
re-encoding the first video frame based at least in part on the first encoded instance of the first video frame so as to generate the second encoded instance of the first video frame with a higher picture quality than the first encoded instance.

6. The method of claim 1, further comprising:
determining the second frame rate based on a configuration of the first device.

7. The method of claim 6, further comprising:
querying the second device via the network to determine the second frame rate.

8. The method of claim 1, further comprising:
executing a video game application at the first device; and
wherein rendering the first stream of unencoded video frames comprises rendering the first stream responsive to instructions executed at the video game application and further responsive to user game controller commands received via the network.

9. A method, comprising:
providing a stream of encoded video frames with a specified frame rate for transmission from a first device to a second device via a network, wherein providing the stream of encoded video frames includes:
encoding a first video frame to generate a first encoded video frame for inclusion in the stream for a first frame period corresponding to the specified frame rate; and
responsive to determining that a second video frame is not ready for encoding for a second frame period following the first frame period, re-encoding the first rendered video frame to generate a second encoded video frame for inclusion in the stream for the second frame period.

10. The method of claim 9, further comprising:
responsive to determining that the second video frame is ready for encoding for the second frame period, encoding the second video frame to generate a third encoded video frame for inclusion in the stream for the second frame period.

11. The method of claim 9, further comprising:
responsive to determining that a third video frame is not ready for encoding for a third frame period following the second frame period, re-encoding the first video frame to generate a third encoded video frame for inclusion in the stream for the third frame period.

12. The method of claim 9, further comprising:
determining the specified frame rate based on at least one of:
a default configuration of the first device; a user-specified setting; a query from the first device to the second device via the network; and an analysis of the network.

13. The method of claim 9, wherein determining that the second video frame is not ready comprises:
determining that a frame buffer of the first device does not contain a completed rendering of the second video frame at an expiration of a timer that corresponds to the a start of the second frame period.

14. The method of claim 13, further comprising:
rendering, at the first device, a sequence of video frames for buffering in the frame buffer at a frame rate lower than the specified frame rate, the sequence including the first video frame and the second video frame.

15. The method of claim 9, wherein re-encoding the first video frame to generate a second encoded video frame comprises:
re-encoding the first video frame based in part on the first encoded video frame so as to generate the second encoded video frame with a higher picture quality than the first encoded video frame.

16. A system, comprising:
a first device comprising:
a network interface configured to couple to a network; and
an encoder coupled to the network interface and configured to encode a first stream of rendered video frames having a first frame rate to generate a second stream of encoded video frames for transmission over the network via the network interface, wherein the second stream has a second frame rate greater than the first frame rate, and wherein the encoder is configured to selectively encode multiple instances of at least one video frame of the first stream for inclusion in the second stream to compensate for a difference between the first frame rate and the second frame rate.

17. The system of claim 16, further comprising:
a second device coupled to the network and configured to receive and decode the second stream of encoded video frames for playback at a display of the second device.

18. The system of claim 17, wherein:
the second device includes at least one of a keyboard or a game controller to provide user input to the first device via the network; and
the first device includes a server configured to execute a video game application to render the first stream of rendered video frames based on the user input.

19. The system of claim 16, wherein the encoder is configured to selectively provide multiple encoded instances of at least one video frame by:
encoding a first video frame of the first stream to generate a first encoded instance of the first video frame for inclusion in the second stream for a first frame period;
determining whether a second video frame of the first stream is ready to be encoded for a second frame period following the first frame period, wherein the first frame period and second frame period are based on the second frame rate;
responsive to determining the second video frame is ready to be encoded, encoding the second video frame to generate an encoded instance of the second video frame for inclusion in the second stream for the second frame period; and
responsive to determining the second video frame is not ready to be encoded, re-encoding the first video frame or duplicating the first encoded instance of the first video frame to generate a second encoded instance of the first video frame for inclusion in the second stream for the second frame period.

20. The system of claim 19, wherein:
the encoder is configured to render each video frame of the first stream in a frame buffer in sequence at the first frame rate; and
the encoder is configured to determine whether the second video frame of the first stream is ready to be encoded for the second frame period by determining, in response to an expiration of a timer, whether the rendering of the second video frame in the frame buffer is completed.

21. The system of any of claim 19, wherein the encoder is configured to selectively provide multiple encoded instances of at least one video frame by:
determining whether a third video frame of the first stream is ready to be encoded for a third frame period following the second frame period;
responsive to determining the third video frame is ready to be encoded, encoding the third video frame to generate an encoded instance of the third video frame for inclusion in the second stream for the third frame period; and
responsive to determining the third video frame is not ready to be encoded, re-encoding the first video frame to generate a third encoded instance of the first video frame for inclusion in the second stream for the third frame period.

22. The system of claim 19, wherein the encoder is configured to re-encode the first video frame based at least in part on the first encoded instance of the first video frame so as to generate the second encoded instance of the first video frame with a higher picture quality than the first encoded instance of the first video frame.

23. The system of claim 16, wherein the encoder is further configured to:
determine the second frame rate based on at least one of: a default configuration; a user-specified setting; an analysis of the network; and a query to a second device coupled to the network and configured to receive and decode the second stream of encoded video frames for playback at a display of the second device.

24. A non-transitory computer-readable medium embodying a set of executable instructions, the set of executable instructions to manipulate at least one processor to:
encode video frames of a first stream of unencoded video frames having a first frame rate to generate a second stream of encoded video frames, the second stream having a second frame rate greater than the first frame rate, wherein the encoding of the video frames includes selectively providing multiple encoded instances of at least one video frame of the first stream for inclusion in the second stream to compensate for a difference between the first frame rate and the second frame rate; and
providing the second stream for transmission via a network.

25. The non-transitory computer-readable medium of claim 24, wherein the executable instructions to manipulate the at least one processor to selectively provide multiple encoded instances of at least one video frame comprise executable instructions to manipulate the at least one processor to:
encode a first video frame of the first stream to generate a first encoded instance of the first video frame for inclusion in the second stream for a first frame period;
determine whether a second video frame of the first stream is ready to be encoded for a second frame period following the first frame period, wherein the first frame period and second frame period are based on the second frame rate;
responsive to determining the second video frame is ready to be encoded, encode the second video frame to generate an encoded instance of the second video frame for inclusion in the second stream for the second frame period; and
responsive to determining the second video frame is not ready to be encoded, re-encode the first video frame or duplicate the first encoded instance of the first video frame to generate a second encoded instance of the first video frame for inclusion in the second stream for the second frame period.

26. The non-transitory computer-readable medium of claim 25, wherein:
- rendering the first stream comprises rendering each video frame of the first stream in a frame buffer in sequence at the first frame rate; and
- determining whether the second video frame of the first stream is ready to be encoded for the second frame period comprises:
  - in response to an expiration of a timer representing an end of the first frame period, determining whether the rendering of the second video frame in the frame buffer has completed.

27. The non-transitory computer-readable medium of claim 25, wherein the executable instructions to manipulate the at least one processor to selectively provide multiple encoded instances of at least one video frame further comprise executable instructions to manipulate the at least one processor to:
- determine whether a third video frame of the first stream is ready to be encoded for a third frame period following the second frame period;
- responsive to determining the third video frame is ready to be encoded, encode the third video frame to generate an encoded instance of the third video frame for inclusion in the second stream for the third frame period; and
- responsive to determining the third video frame is not ready to be encoded, re-encode the first video frame or duplicate the first encoded instance of the first video frame to generate a third encoded instance of the first video frame for inclusion in the second stream for the third frame period.

* * * * *